(12) United States Patent
Kristinsson et al.

(10) Patent No.: US 9,663,111 B2
(45) Date of Patent: May 30, 2017

(54) VEHICLE SPEED PROFILE PREDICTION USING NEURAL NETWORKS

(71) Applicants: FORD GLOBAL TECHNOLOGIES, LLC, Dearborn, MI (US); THE REGENTS OF THE UNIVERSITY OF MICHIGAN, Ann Arbor, MI (US)

(72) Inventors: Johannes Geir Kristinsson, Ann Arbor, MI (US); Ryan Abraham McGee, Shangai (CN); Anthony Mark Phillips, Northville, MI (US); Ming Lang Kuang, Canton, MI (US); Wenduo Wang, Ann Arbor, MI (US); Jungme Park, Novi, MI (US); Yi Murphey, Ann Arbor, MI (US); Chen Fang, Westland, MI (US)

(73) Assignees: Ford Global Technologies, LLC, Dearborn, MI (US); The Regents Of The University Of Michigan, Ann Arbor, MI (US)

(*) Notice: Subject to any disclaimer, the term of this patent is extended or adjusted under 35 U.S.C. 154(b) by 40 days.

(21) Appl. No.: 14/291,858

(22) Filed: May 30, 2014

(65) Prior Publication Data
US 2015/0344036 A1 Dec. 3, 2015

(51) Int. Cl.
| | |
|---|---|
| *B60W 40/06* | (2012.01) |
| *B60W 50/00* | (2006.01) |
| *B60W 10/08* | (2006.01) |
| *B60W 40/04* | (2006.01) |
| *B60W 10/06* | (2006.01) |
| *B60W 20/12* | (2016.01) |

(52) U.S. Cl.
CPC ............ *B60W 40/06* (2013.01); *B60W 10/06* (2013.01); *B60W 10/08* (2013.01); *B60W 20/12* (2016.01); *B60W 40/04* (2013.01); *B60W 50/0097* (2013.01); *B60W 2520/10* (2013.01); *B60W 2720/103* (2013.01); *Y02T 10/6286* (2013.01)

(58) Field of Classification Search
CPC ................. B60W 40/06; B60W 40/04; B60W 2720/103; B60W 2520/10
USPC .......................................................... 701/22
See application file for complete search history.

(56) References Cited

U.S. PATENT DOCUMENTS

| | | | |
|---|---|---|---|
| 4,814,991 A * | 3/1989 | Tada | B60K 31/107 123/352 |
| 7,831,380 B2 | 11/2010 | Chapman et al. | |
| 8,260,515 B2 | 9/2012 | Huang et al. | |
| 8,290,695 B2 * | 10/2012 | Hiestermann | G01C 21/32 15/42 |
| 8,396,663 B2 | 3/2013 | Tennent et al. | |

(Continued)

*Primary Examiner* — Rodney Butler
*Assistant Examiner* — Frederick Brushaber
(74) *Attorney, Agent, or Firm* — David B. Kelley; Brooks Kushman P.C.

(57) ABSTRACT

A vehicle includes a powertrain having an electric machine and an engine. The vehicle also includes a controller programmed to operate the powertrain according to a predicted vehicle speed profile for a predetermined route segmented according to a group of driving zone types, wherein each driving zone type is associated with a different characteristic speed profile shape and vehicle location. The controller is further programmed to update the predicted segment speed profile in response to deviation between the predicted speed profile and a measured speed profile.

11 Claims, 9 Drawing Sheets

(56) References Cited

U.S. PATENT DOCUMENTS

| | | | |
|---|---|---|---|
| 2008/0236911 A1* | 10/2008 | Yamamoto | B60W 10/06 180/65.265 |
| 2010/0250127 A1* | 9/2010 | Hilbrandie | G01C 21/32 701/533 |
| 2010/0305798 A1* | 12/2010 | Phillips | B60W 40/09 701/22 |
| 2011/0106370 A1* | 5/2011 | Duddle | G06Q 40/08 701/31.4 |
| 2011/0106416 A1 | 5/2011 | Scofield et al. | |
| 2011/0137545 A1 | 6/2011 | Downs et al. | |
| 2011/0307166 A1* | 12/2011 | Hiestermann | G01C 21/32 701/119 |
| 2012/0022764 A1* | 1/2012 | Tang | B60W 10/06 701/102 |
| 2013/0018536 A1* | 1/2013 | Cooper | B61L 3/008 701/20 |
| 2013/0046457 A1* | 2/2013 | Pettersson | G01C 21/3469 701/117 |
| 2013/0261970 A1* | 10/2013 | Papajewski | G01C 21/32 701/540 |
| 2014/0002277 A1* | 1/2014 | Fulger | G01C 21/3415 340/905 |
| 2014/0058673 A1* | 2/2014 | Wolf | G01C 21/3469 701/533 |
| 2015/0344036 A1* | 12/2015 | Kristinsson | B60W 40/06 701/22 |

\* cited by examiner

VEHICLE SPEED PROFILE PREDICTION USING NEURAL NETWORKS

TECHNICAL FIELD

The present disclosure relates to predictive vehicle route planning and energy management.

BACKGROUND

Hybrid Electric Vehicles (HEV's) may replenish electrical energy by using the internal combustion engine to operate a generator. The electricity produced by the generator may be stored in a battery. HEV systems can also recover kinetic energy by using the momentum of the vehicle to turn the generator. The electricity produced may be stored in the battery for subsequent use. Plug-in Hybrid Electric Vehicles (PHEVs) are an extension of existing HEV's with added energy flexibility. A PHEV may utilize a larger capacity battery pack than a standard HEV, and the PHEV has two initial sources of energy—fuel as well as electricity from the electric utility grid.

An objective of a HEV control system may be to minimize energy operational costs and emissions without compromising the vehicle drivability. Energy management control strategies may operate the HEV in electric drive mode in which the vehicle is operated with only the electric motor providing propulsion to maximize the battery power output. In a hybrid operation mode, the vehicle is propelled by both the engine and the electric motor. Advanced powertrain planning techniques may serve to enhance energy planning by maximizing the use of electric drive mode.

Similarly, conventional vehicles having an internal combustion engine as the sole means of propulsion rely on range prediction in order to provide drivers with accurate estimation of the distance available to be driven based on the fuel available at a given instant. Advanced planning techniques may enhance fuel consumption and enable a more accurate distance to empty calculation.

SUMMARY

In at least one embodiment, a vehicle includes a powertrain including an electric machine and an engine, and a controller programmed to operate the powertrain for each of a plurality of segments defining a route according to a predicted vehicle speed profile for the segment associated with one of a group of driving zone types. Each driving zone type defines a different characteristic speed profile and vehicle location. The controller is further programmed to update the predicted speed profile associated with the driving zone type in response to deviation between the predicted speed profile and a measured speed profile.

In at least one embodiment, a method of operating a vehicle includes classifying, based on historical driving data, each of a series of segments of a predetermined route into one of a group of driving zone types. The method also includes generating, using a processor, a predicted speed profile for each segment corresponding to a particular one of the driving zone types, and updating the predicted speed profile for each segment having a deviation between a measured speed profile and the predicted speed profile.

In at least one embodiment, a vehicle includes a powertrain and a controller having a neural network assigned to a driving zone type. The controller is programmed to operate the powertrain along a route segment defined by the driving zone type according to a predicted speed profile associated with the driving zone type, and update the predicted speed profile for use in subsequent trips along the route segment based on a measured deviation from the predicted speed profile.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
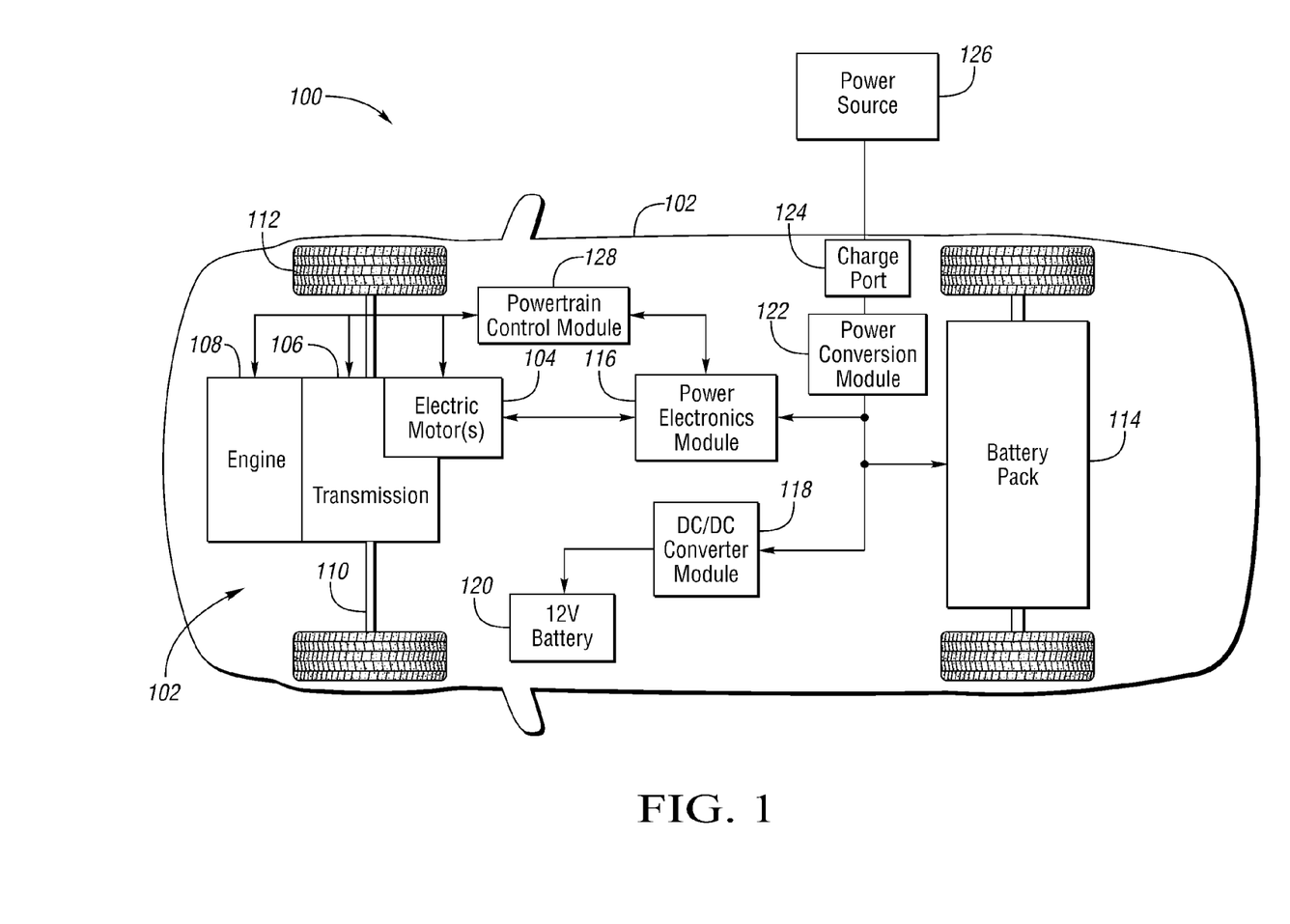
FIG. 1 is a schematic view of a hybrid-electric vehicle.

FIG. 1 depicts an example of a plug in hybrid-electric vehicle 100. A hybrid-electric powertrain 102 may comprise one or more electric machines, or electric motors 104 mechanically connected to a hybrid transmission 106. In addition, the hybrid transmission 106 is mechanically connected to an engine 108. The hybrid transmission 106 may also be mechanically connected to a drive shaft 110 that drives wheels 112. The electric motor(s) 104 can provide vehicle propulsion when the engine 108 is turned on, as well as when the engine is turned off. The electric motor(s) 104 can additionally provide vehicle deceleration by imparting a resistive torque upon the drive shaft. The electric motor(s) 104 may also be configured as electric generators and provide fuel economy benefits by recovering energy that would normally be lost as heat in the friction braking system. The electric motor(s) 104 may also reduce pollutant emissions since the hybrid electric vehicle 102 may be operated in an electric machine powertrain mode under certain conditions.

The traction battery, or battery pack 114, stores energy that can be used to power the electric motor(s) 104. A vehicle battery pack 114 is capable of providing a high voltage DC output. The battery pack 114 is electrically connected to a power electronics module 116. The power electronics module 116 is electrically connected to the electric motor(s) 104, and provides the ability to bi-directionally transfer energy between the battery pack 114 and the electric motor(s) 104. For example, the battery pack 114 may provide a DC voltage while the electric motor(s) 104 may require a three-phase AC current to function. In this case, the power electronics module 116 converts the DC voltage to a three-phase AC current to be received by the electric motor(s) 104. In a regenerative mode, the power electronics module 116 will convert the three-phase AC current from the electric motor(s) 104 acting as generators to the DC voltage required by the battery pack 114. The methods described herein are equally applicable to a pure electric vehicle or any other device using a battery pack.

In addition to providing battery power for propulsion, the battery pack 114 may provide energy for other vehicle electrical systems. A DC/DC converter module 118 is capable of converting the high voltage DC output of the battery pack 114 to a low voltage DC supply that is compatible with low voltage vehicle loads. Other high voltage loads, such as compressors and electric heaters, may be connected directly to the high-voltage bus from the battery pack 114. The low voltage systems may also be electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 such that the power conversion module 122 may not be necessary. For example, the functions of the power conversion module 122 may be contained in the external power source 126. The vehicle powertrain including engine, transmission, electric motors, electric generators and power electronics may be controlled by a powertrain control module (PCM) 128.

In addition to illustrating a plug-in hybrid vehicle, FIG. 1 can be representative of a battery electric vehicle (BEV) configuration if the engine 108 is removed. As a second example vehicle configuration which may benefit from aspects disclosed herein, FIG. 1 can represent a traditional hybrid electric vehicle (HEV) or a power-split hybrid electric vehicle if the components 122, 124, and 126 that are related to plug in charging are removed.

A third example vehicle configuration which may benefit from aspects disclosed herein is a conventional vehicle having only the internal combustion engine 108 as a propulsion source. Such a conventional vehicle may not include electric motor(s) 104 or battery pack 114 that are capable of providing additional vehicle traction torque. Advanced route planning techniques may serve to derive more accurate distance to empty readings to provide to an operator. Additionally, accurate route planning may serve to allow a powertrain controller to adjust engine operation in view of upcoming load conditions to provide the best available operating efficiency.

Prediction of vehicle speed along a predetermined route can be based in part on data indicative of existing driving behavior, which may include a historical driving profile, or historical traffic pattern data, as well as static information about the route (geometric paths, speed limits, etc.). Using historical data as the sole basis is limited relative to the quality, accuracy, and timeliness of data. For example, database information pertaining to speed limits may not accurately reflect actual driving patterns, which often deviate significantly from posted limits. Ongoing speed pattern recognition as disclosed herein can serve to improve accuracy of speed prediction in support of vehicle energy planning over a predetermined route.

Artificial neural network processors implemented in a vehicle controller allow a subject vehicle to "learn" as it is repeatedly driven over various routes. Conventional computers use an algorithmic approach—i.e. the computer follows a set of instructions to solve a problem. Unless the specific steps that the computer needs to follow are pre-programmed, the computer is limited with regard to the problems it is capable of solving. To this end, the problem solving capability of conventional computers may be restricted to problems which are previously understood with known solutions. Neural network processing allows collective behavior of a network of interconnected neurons. Each neuron evolves its calculations by continuously evaluating its output by looking at the inputs, calculating the weighted sum and comparing it to a threshold to decide whether each neuron should fire. The dependence of output values upon input values is complex, and it includes all synaptic weights and thresholds. Often this dependence does not have a meaningful analytic expression. However, this is not necessary because there are learning algorithms that, given the inputs, adjust weighting factors to produce the required output. There is a training phase where known patterns are presented to the network and weighting is adjusted to produce required outputs. Then, there is a recognition phase where the weighting factors are fixed, the patterns are again presented to the network and it recalls the outputs. One or more hidden layers may allow more complex analysis of the input data. Learning is achieved generally by assessing output error compared to actual measured values. For subsequent predictions, adjustments to weighting factors may be applied to one or more calculation steps to improve overall prediction accuracy.

Figure 2:
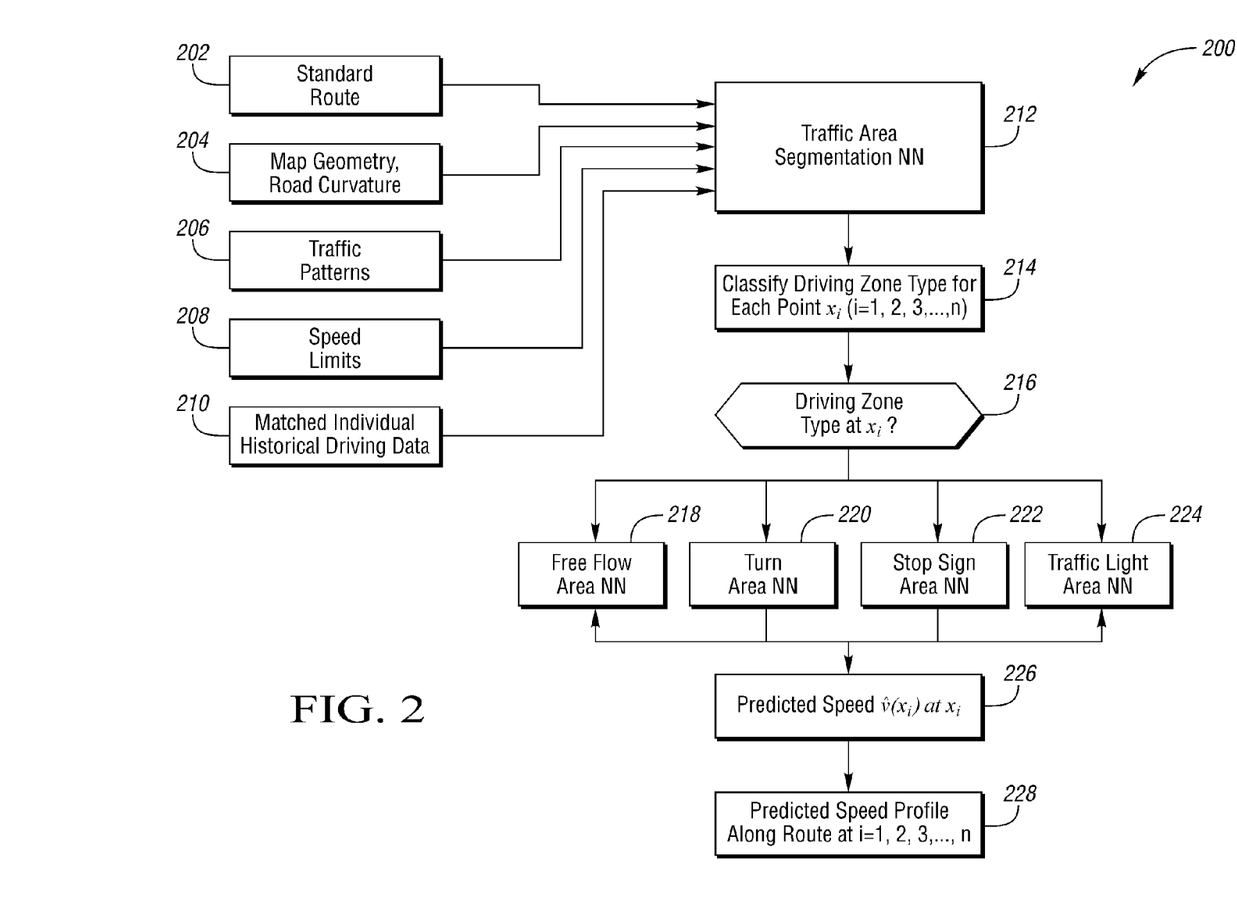
FIG. 2 is a flow chart of a method of predicting a speed profile along a route.

FIG. 2 depicts a flow chart of a method of predicting a speed profile along a route. The method is generally indicated by reference numeral 200. Both static and dynamic information sources serve as input to the prediction model. The desired route is input at step 202 from a user and includes the origin and destination locations. The particular map geometry of the route is input at step 204 from map data and includes road curvature information. Current traffic patterns may also be input at step 206 from an external source providing real time traffic information that reflects flow, speed, and density of traffic along the route. Regulatory speed limits are generally static and are also input at step 208 to the speed prediction model. Historical driving data is also input at step 210 and is reflective of driving behavior of the particular driver.

Each of the inputs is provided to a segmentation neural network processor at step 212 to separate the route into a sequence of segments. At step 214, a neural network processor classifies each segment based on the driving behavior along the corresponding segment. The classifications are selected from a discrete group of driving zone types, and are associated with the relevant segments at step 216. Each of a set of driving types exhibits a different characteristic speed profile shape. As a result, the predetermined route is segmented according to the group of driving zone types. Because the driving behaviors and relevant factors differ for each driving zone type, separate learning neural network processors predict vehicle speed for each driving zone type along the corresponding segment of the route. A predicted vehicle speed profile is generated at step 218 for free flow areas of the route using a trained neural network having learning parameters associated with free flow driving zone areas. A speed profile is generated at step 220 for turning areas of the route using a neural network having learning parameters associated with turning areas. A predicted vehicle speed profile is generated at step 222 for stop sign areas of the route using a neural network having learning parameters associated with stop sign driving zone areas. A predicted vehicle speed profile is generated at step 224 for traffic light areas of the route using a neural network having learning parameters associated with traffic light driving zone areas. Each neural network is discussed in more detail below. The predicted vehicle speed corresponding to each of the series of segments along the route is output at step 226. Finally an overall route speed profile is determined at step 228. It is contemplated that although four types of driving zones are discussed herein, other driving zone types may be suitable for route forecasting.

Figure 3:
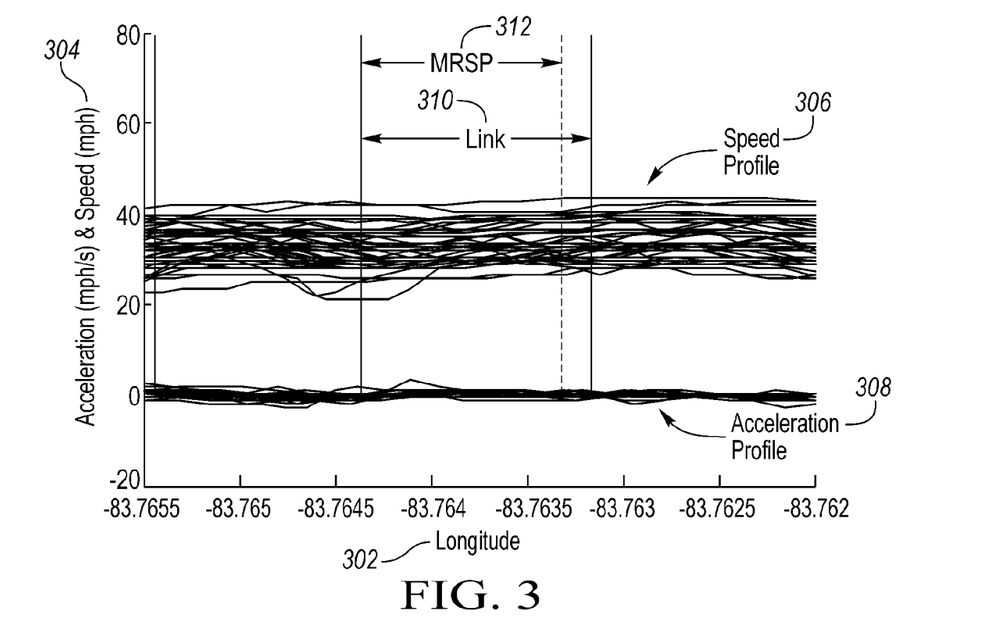
FIG. 3 is a plot of an example speed profile of a free flow traffic area.

FIG. 3 illustrates speed and acceleration profiles of a driving zone that may be input to the classification neural network as discussed above. Location is represented along the horizontal axis as longitude 302. Although longitude is depicted, other indicators of location and/or distance may be used in a similar fashion. Acceleration and speed are represented on the vertical axis 304. Multiple data samples of speed profiles 306 and acceleration profiles 308 are shown in the plot. The profiles are grouped together based on a location range denoted by a link 310. The link distances may vary from profile to profile depending on the shape of the speed profile. Within each link, points along each profile are compared to ensure equality of the type of curvature between the speed profiles. The most representative shape point (MRSP) 312 is an area within the link 310 that contains the minimum speed of most trips within the link. Each link has one MRSP determination within the link. While one example MRSP is shown, a number of characteristic segments are identified along a given route. The speed profiles 306 and acceleration profiles 308 depicted in FIG. 3 correspond to a free flow traffic area. These areas are characterized by the profile shape of changes in vehicle speed. For this driving zone type, the speed profiles 306 exhibit some variance, but are relatively constant in each profile. The acceleration is also generally zero for each profile along the MRSP 312 of the route.

Figure 4:
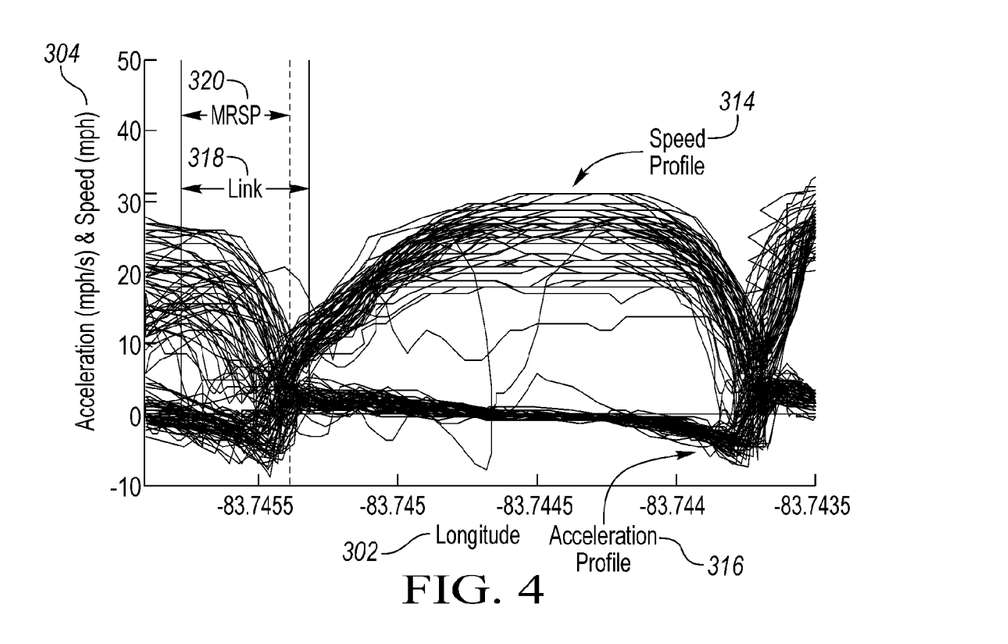
FIG. 4 is a plot of an example speed profile of a stop sign traffic area.

FIG. 4 depicts speed and acceleration profiles of a second driving zone that may be input to the classification neural network. Similar to above, location is represented along the horizontal axis as longitude 302, and acceleration and speed are represented on the vertical axis 304. Several speed profiles 314 are provided in the plot. Also, a group of corresponding acceleration profiles 316 is shown. The speed profiles are similarly grouped by the comparative shapes. In this case, the link area 318 is located at the characteristic area of the speed profiles 314 and the acceleration profiles 316. The MRSP 320 of this driving zone type is similarly shifted. The speed profiles 314 and acceleration profiles 316 correspond to a stop sign traffic area. The speed profiles 314 have slightly different deceleration rates, but almost all decrease to zero at a common location. Certain outlying curves may be discarded as uncharacteristic, for example from a single failure to stop at a stop sign. Additionally, the acceleration profiles 316 reflect negative acceleration before the stop location, and positive acceleration following the stop location having zero speed.

Figure 5:
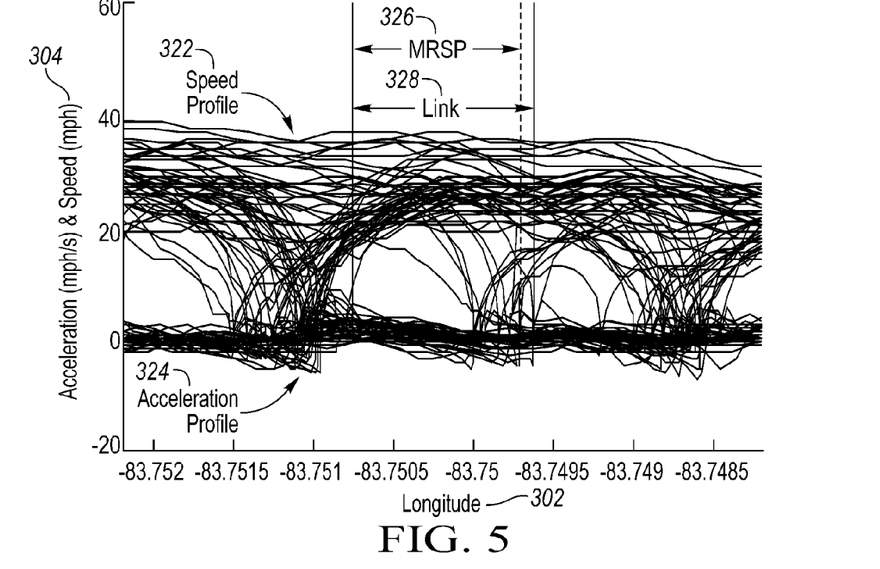
FIG. 5 is a plot of an example speed profile of a traffic light traffic area.

FIG. 5 depicts a plot of a third driving zone type as it may be input to the classification neural network. Location is represented along the horizontal axis as longitude 302, and acceleration and speed are represented on the vertical axis 304. Several speed profiles 322 are provided in the plot. Corresponding acceleration profiles 324 are also shown. A MRSP 326 of this driving type is similarly located along the characterizing portion of the speed profiles 322. In the example of FIG. 5, the speed profiles 322 and acceleration profiles 324 correspond to a traffic light traffic area. The population of the speed profiles 322 appears bi-modal, in that one group of profiles exhibit relatively constant speed through the location, and another group of profiles exhibit a stop similar to a stop sign. Because there are two different vehicle behaviors at the same location, the population is indicative of a traffic light where there are periods where vehicles stop, and alternate periods where vehicles maintain constant velocity through the light.

The neural network is trained to recognize and associate particular patterns with particular driving zones and corresponding locations. In this way, when the vehicle traverses the same portions of the route, a vehicle energy management controller can plan energy usage based on the expected upcoming speed.

Figure 6:
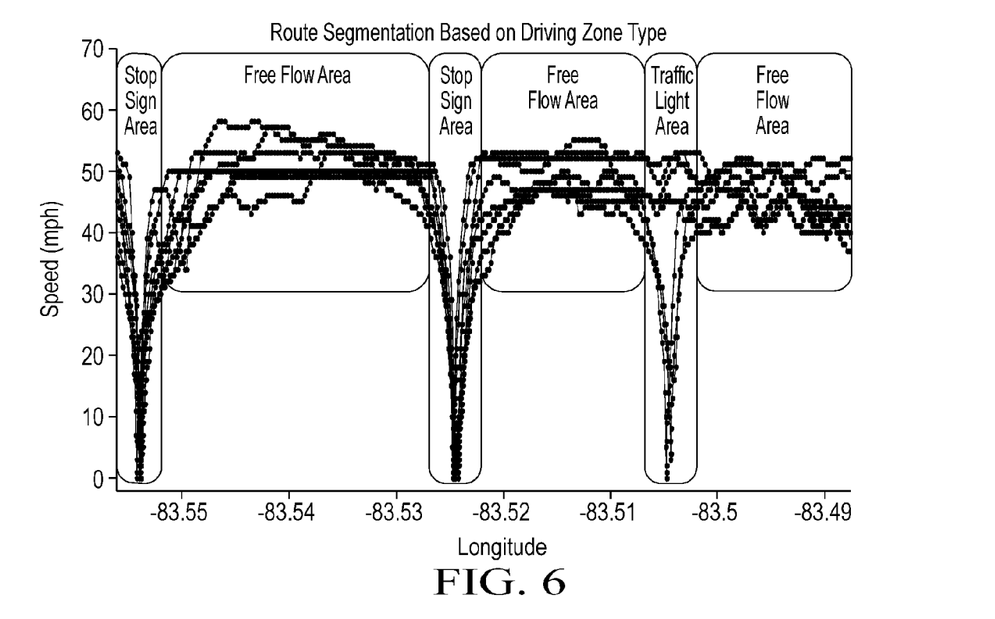
FIG. 6 is a plot of an example of a compiled series of classified route segments of a predetermined route.

FIG. 6 depicts an example of a compilation of a series of several route segments classified according to the methods described above. Each segment of the speed profile is characterized by the representative shape of the driving zone. The juxtaposition of the series of segments defines an overall speed profile for the entire route.

Figure 7:
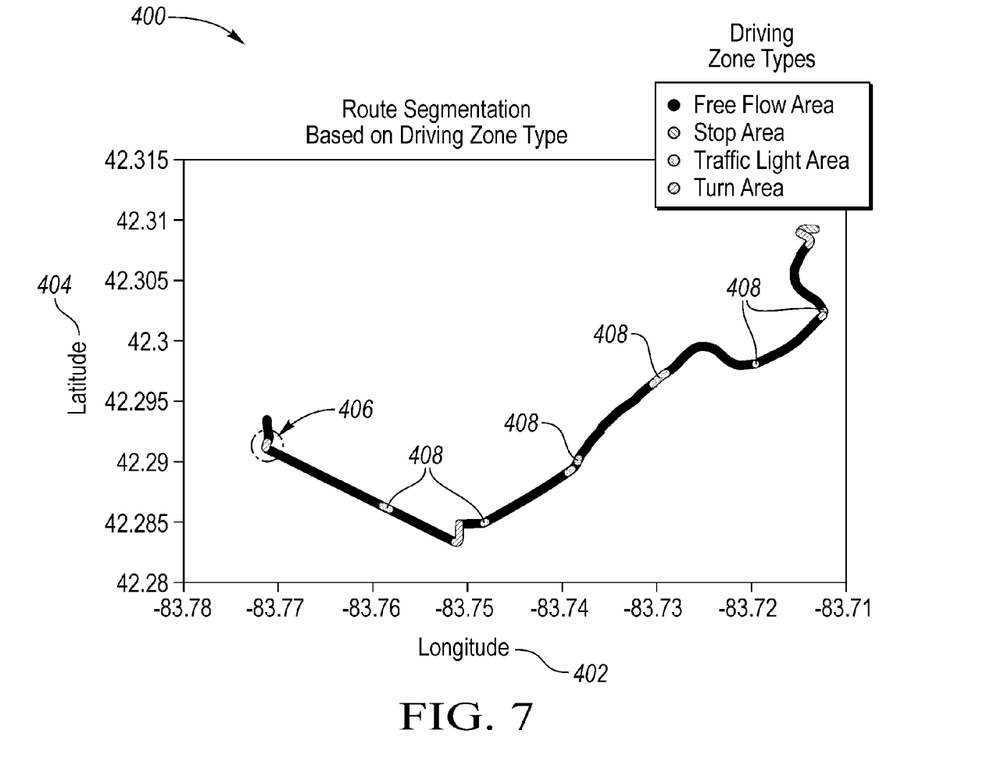
FIG. 7 is a plot of a second example of a compiled series of classified route segments of a predetermined route.

FIG. 7 is a plot 400 showing an example of a spatial characterization of route segmentation using both longitude and latitude of the vehicle location as it traverses a route. The horizontal axis corresponds to longitude 402, and the vertical axis corresponds to latitude 404. Driving zone types may be more precisely associated with geographical information by employing both directions of location coordinates. For example, region 406 depicts a change in direction between two different free flow areas, indicating a turn area. Also, the longitude and latitude coordinates of several traffic lights 408 are shown along the route. The locations of each of the driving zones are predicted based on previous driving pattern recognition.

Referring to FIGS. 8A through 8D, a neural network processor corresponding to each driving zone type may be used to predict the vehicle speed profile along that portion of the route once each segment of the route is classified. In at least one embodiment, at least one neural network processor is assigned to a particular drive zone type. Each driving zone type may also have a different corresponding set of input values to predict the speed profile for the relevant segment. By employing a unique set of input parameters, a custom analysis may be learned for each driving zone type.

Figure 8A:
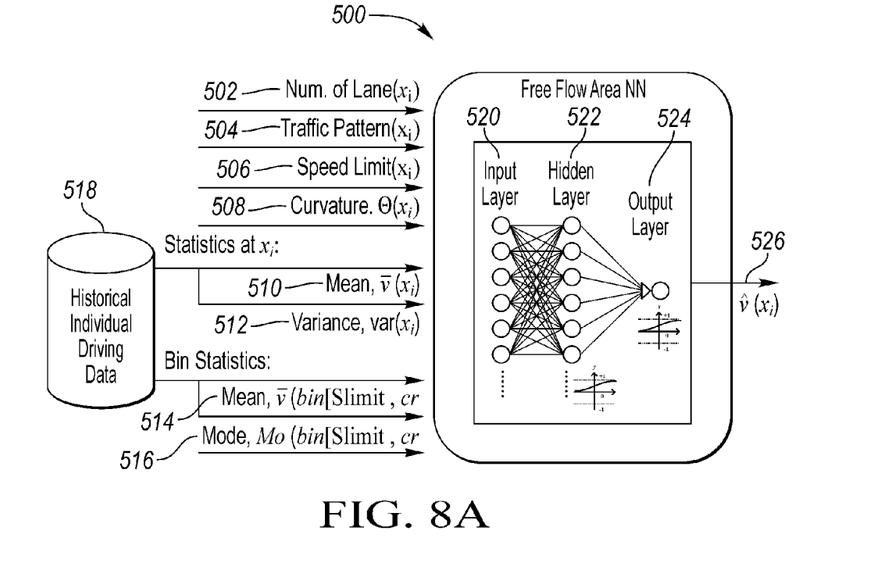
FIG. 8A is a system diagram of a neural network processor corresponding to a free flow driving zone type.

Referring to FIG. 8A, a system diagram of neural network 500 corresponding to a free flow area is depicted. In the case of a free flow area, the number of lanes 502, the traffic pattern 504, the speed limit 506, and the road curvature 508, each for points along the route may serve as inputs to the prediction neural network processor. Additionally, historical driving data 518 may further serve as input to the network. The historical speed mean 510, historical speed variance 512, the speed limit mean 514, and the speed limit mode 516 are also assessed for points along the route. The inputs may collectively be referred to as the input layer 520. The inputs are processed by one or more hidden layers 522 of the neural network 500. An output layer 524 is indicative of a predicted vehicle speed profile 526 for all points in the relevant free flow segment of the route.

Figure 8B:
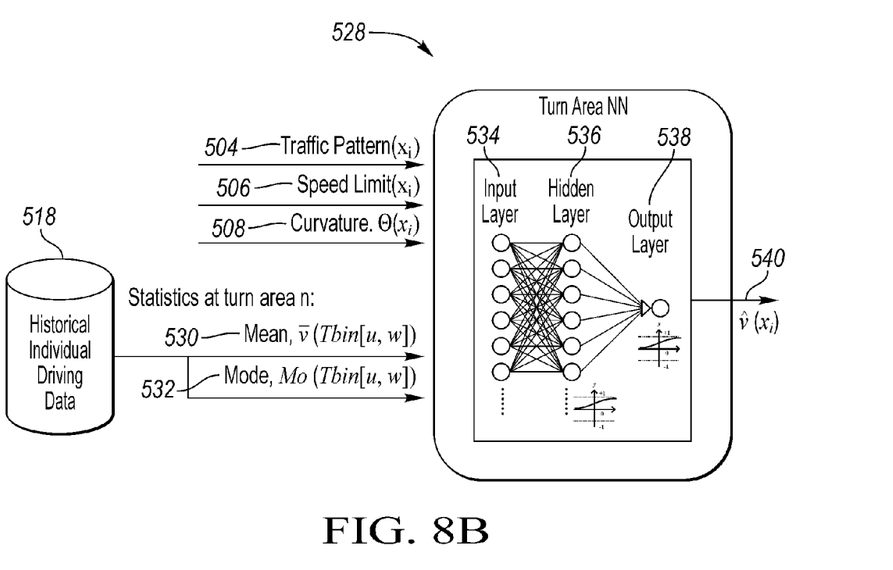
FIG. 8B is a system diagram of a neural network processor corresponding to a turn driving zone type.

Referring to FIG. 8B, a system diagram for a neural network 528 corresponding to a turn area is depicted. In the case of a turn area, the traffic pattern 504, the speed limit 506, and the road curvature 508 may serve as inputs to the prediction neural network processor. Similarly, historical driving data 518 influences the predicted speed profile. The historical speed mean through the turn 530, and the historical speed mode through the turn 532 also operate as inputs to the neural network 528. The aggregate of the inputs serve as the input layer 534. The network 528 processes the inputs using one or more hidden layers 536 and an output layer 538 is indicative of a predicted vehicle speed profile 540 for all points in the relevant turn area segment of the route.

Figure 8C:
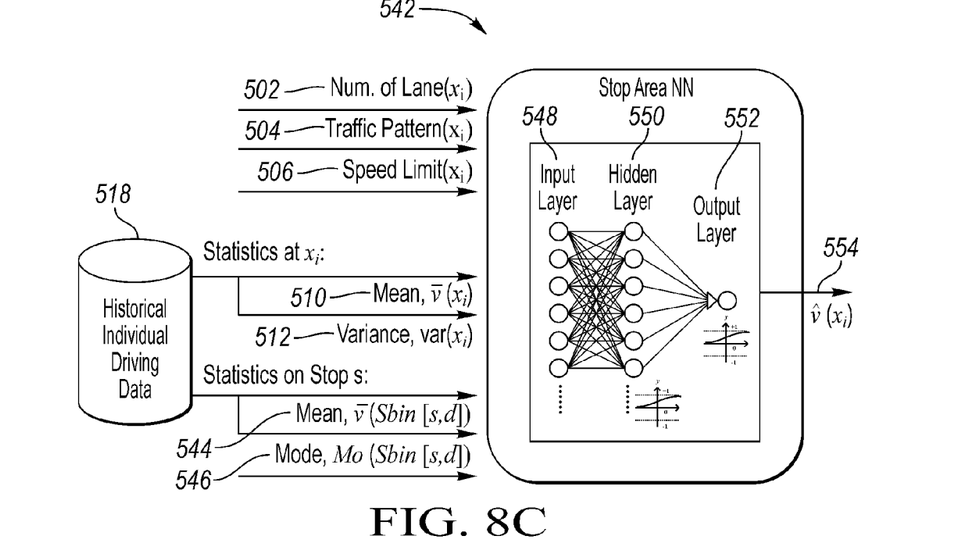
FIG. 8C is a system diagram of a neural network processor corresponding to a stop sign driving zone type.

Referring to FIG. 8C, a system diagram for a neural network 542 corresponding to a stop area is depicted. Similar to the driving zones described above, a unique set of inputs is provided to generate a predicted speed profile in stop areas. The number of lanes 502, the traffic pattern 504, and the speed limit 506, each for points along the route may serve as inputs to the prediction neural network processor. Also, historical driving data 518 including the historical speed mean 510 and historical speed variance 512 along the route, as well as the speed mean in the stop area 544 and speed mode 546 serve as inputs to the neural network 542. Collectively, all the inputs comprise the input layer 548. The inputs are processed using one or more hidden layers 550 of the neural network 542. An output layer 552 is indicative of a predicted vehicle speed profile 554 for all points in the relevant free flow segment of the route.

Figure 8D:
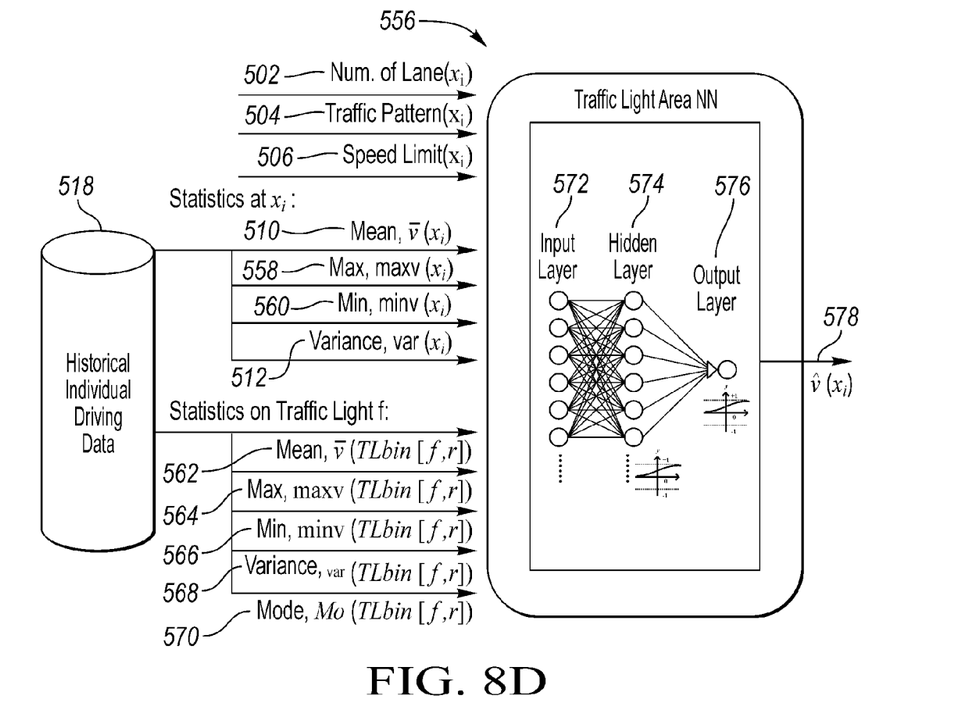
FIG. 8D is a system diagram of a neural network processor corresponding to a traffic light driving zone type.

Referring to FIG. 8D, a system diagram for a neural network 556 corresponding to a traffic light area is depicted. A unique set of inputs is provided for points along the route to generate a predicted speed profile in traffic light areas, including the number of lanes 502, the traffic pattern 504, and the speed limit 506. Also, historical driving data 518 along the route including the historical speed mean 510, speed maximum 558, speed minimum 560, and historical speed variance 512 serve as inputs to the neural network 542. Other historical driving data 518 relevant to the traffic light area may also be used, such as the speed mean 562, speed maximum 564, speed minimum 566, speed variance 568, and speed mode 570 in the traffic light area may also serve as input to the speed prediction in traffic light areas. Consistent with the other neural networks, the collection of inputs serves as the input layer 572, which is processed using one or more hidden layers 574. The output layer 576 is representative of a speed profile 578 for all points in the relevant traffic light area of the route.

Figure 9:
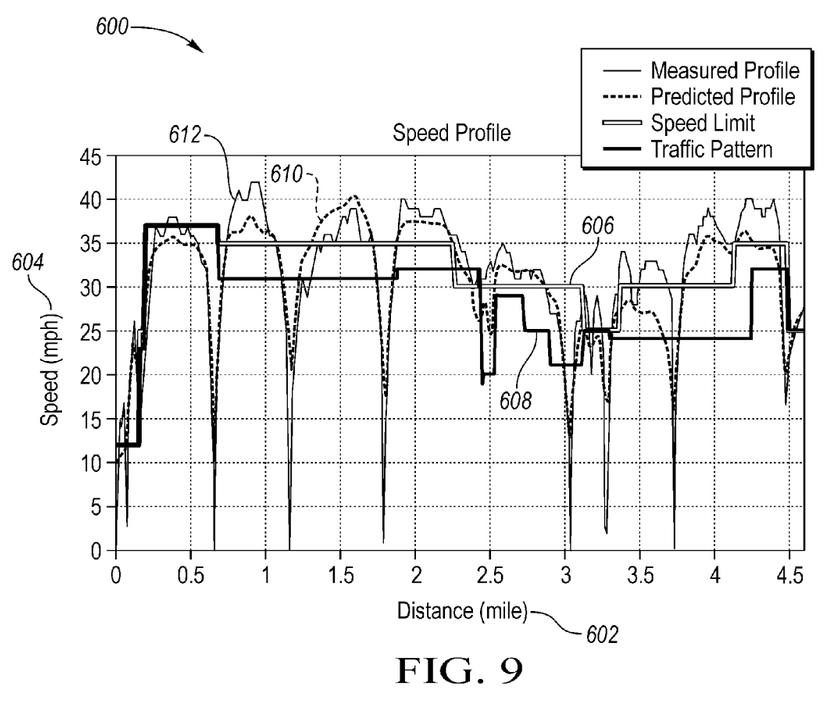
FIG. 9 is an overlaid plot of static inputs, a predicted speed profile, and a measured speed profile.

FIG. 9 depicts a plot 600 of a resultant speed profile prediction of the group of neural network processors. The plot depicts distance 602 on the horizontal axis, and speed 604 on the vertical axis. The plot further overlays several data curves relevant to the speed prediction. Curve 606 represents the speed limit profile along the route, for example as received from a static transportation database. Curve 608 represents the traffic speed pattern, for example as received from a traffic and regulation information center. Curve 610 represents the predicted speed profile generated according to the methods discussed herein. Curve 612 represents the measured speed profile along the route. As can be seen from the plot, the predicted speed profile curve 610 matches the measured speed profile 612 very well throughout a majority of the route. Additionally, deviations between the predicted and measured values feed back into the neural network processors by way of the historical driving data discussed above. In response to the deviations, weighting adjustment factors may be applied to one or more input values to enhance prediction capability. In this way, since the system continues to learn and adjust the speed profile of the route, the predictions become more accurate on subsequent trips over the same route segments. It should be further noted from the plot 600 that the actual driving speed deviates frequently from both the speed limit profile curve 606 and the traffic speed pattern curve 608. These curves may carry less weight in the neural network processing, and therefore have less overall influence on the speed prediction, particularly at stop signs and traffic light areas. In at least one embodiment, a controller updates the predicted speed profile for those segments showing deviation between the predicted speed profile and a measured speed profile.

Figure 10A:
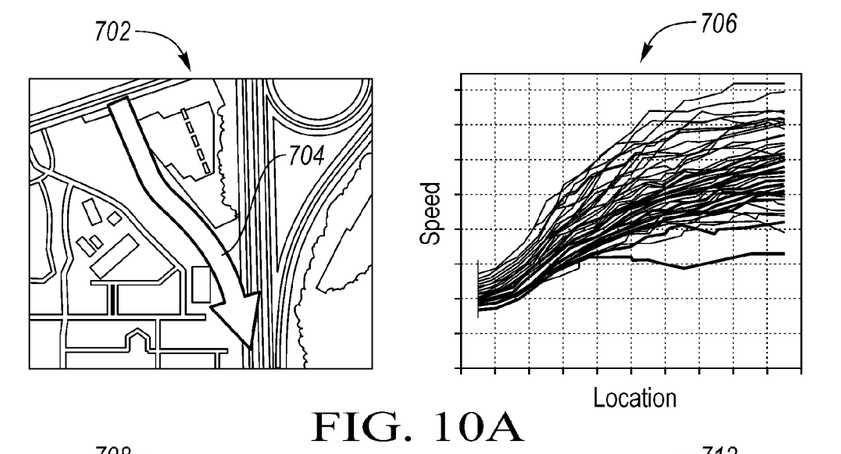
FIG. 10A is a depiction of a freeway entrance ramp driving zone type.
Figure 10B:
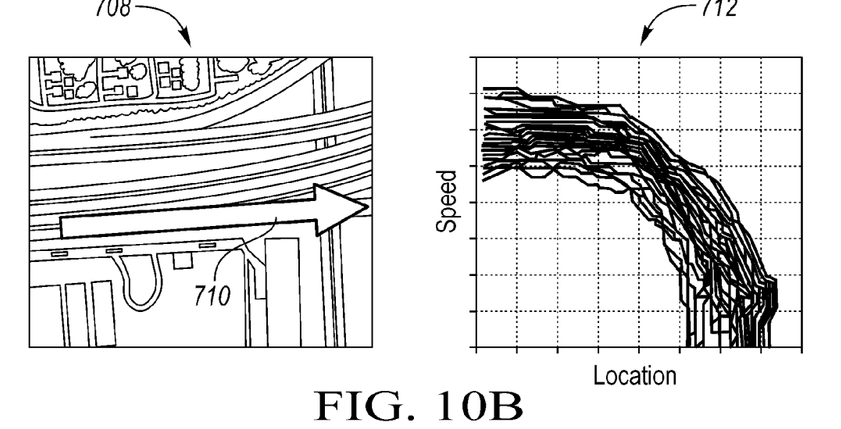
FIG. 10B is a depiction of a freeway exit ramp driving zone type.
Figure 10C:
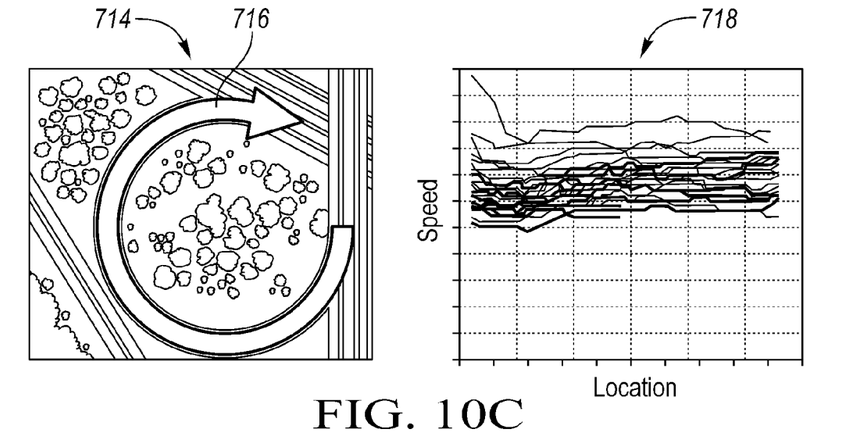
FIG. 10C is a depiction of an inter-freeway ramp driving zone type.

In an alternative embodiment, additional route driving zone types may also be classified and predicted. Other aspects of driving patterns may be used to define the additional driving zone types. Referring to FIGS. 10A through 10C, various freeway ramps may be modeled based on driving behavior over relevant portions of the route. Additional neural networks may be assigned to generate predicted speed profiles over freeway ramps once a segment is classified as a ramp.

Similar to the classification techniques discussed above, dynamic traffic information, historical driving data, and road geometry may each be used to classify each type of freeway ramp. In addition, because entry and exit ramps may involve rapid increases or decreases in vehicle speed, the temporal aspect of the analysis may be particularly relevant for freeway ramps. In at least one embodiment, there are three categories of ramps considered: entrance ramps, exit ramps, and inter-freeway ramps. It is contemplated that other more particular variants of freeway ramps may be suitable.

Referring to FIG. 10A, vehicle behavior on a freeway entrance ramp area is shown. An aerial map view 702 depicts road geometry of the entrance ramp and direction of vehicle travel 704. A corresponding speed versus location plot 706 illustrates various speed profiles showing the acceleration of a vehicle entering a freeway. Each of the speed profiles exhibits a characteristic speed increase that corresponds to the geometric vehicle path. Yet different drivers may employ different acceleration rates during entry. Additionally, a given driver may accelerate differently under different conditions. For example, dynamic conditions such as time of day, traffic, and weather each may vary a particular driver's approach to acceleration in preparation for freeway merging. Similar neural network processing techniques as described above may be used to categorize and predict vehicle speed for freeway entrance ramps based on the representative shapes of the historical driving patterns. A categorization processor as described above may have sufficient criteria to classify freeway entrance ramps. The dynamic conditions may cause weighting to certain portions of the prediction calculation to maintain its accuracy. In this way, the predicted speed profile of a neural network processor may be less sensitive to erroneous and abnormal data acquired during the segment. Similar to the above embodiments, there may be a dedicated processor assigned to generate predicted speed profiles for freeway entrance ramps. Advance knowledge of this rapid acceleration may allow the vehicle to plan ahead for the required propulsion power from the engine and/or the motor.

Referring to FIG. 10B, a freeway exit ramp area is illustrated. An aerial map view 708 shows road geometry of the exit ramp and the direction of vehicle travel 710. The corresponding speed versus location plot 712 shows various speed profiles of a vehicle exiting a freeway. In this case, the speed profiles exhibit a common pattern of deceleration that corresponds to the geometric vehicle path. Similar to the above discussion in reference to entry ramps, drivers exhibit variation across their respective deceleration patterns. The variation is further increased by dynamic conditions that affect a given driver's behavior, such as weather or traffic. A neural network processor may have additional criteria to categorize freeway exit ramps based on the representative shapes of the historical driving patterns. Additionally, there may be a dedicated processor assigned to predict vehicle speed for freeway exit ramp driving zone types by considering a unique set of inputs corresponding to freeway exit ramps. Advance knowledge of periods of rapid deceleration allows for planning of power recovery through regenerative braking for example.

Referring to FIG. 10C, a third type of freeway ramp is illustrated. An aerial map view 714 shows road geometry of an inter-freeway ramp area. The location and direction of travel 716 shows a generally circular route segment commonly used for inter-freeway ramps. The corresponding speed versus location plot 718 shows various speed profiles of a vehicle transitioning from one freeway to another. In this case, the speed profiles exhibit a common pattern of slight deceleration, then constant speed, then re-acceleration following the ramp. This pattern corresponds to the circular geometric vehicle path. Variance occurs across drivers, as well as across different dynamic driving conditions. Much like other freeway ramp types described above, a classification processor may include criteria specific to inter-freeway ramps. Also, a dedicated processor may operate to predict vehicle speed based on a unique set of inputs that corresponds to inter-freeway ramps. Each of the freeway ramps discussed in reference to FIGS. 10A through 10C may comprise additional driving zone types. There may also be dedicated neural network processors for speed prediction over the route.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a powertrain including an electric machine and an engine; and
a controller programmed to for each of a plurality of segments defining a route (i) operate the powertrain according to a predicted vehicle speed profile for the segment associated with one of a group of driving zone types each defining a different characteristic speed profile and vehicle location, and (ii) in response to deviation between the predicted speed profile and a measured speed profile, update the characteristic speed profile associated with the driving zone type.

2. The vehicle of claim 1 wherein the controller further comprises at least one neural network processor programmed to partition the route into segments according to driving zone type.

3. The vehicle of claim 1 wherein the controller further comprises at least one neural network processor programmed to generate the predicted vehicle speed profiles based on data corresponding to historical driving patterns.

4. The vehicle of claim 3 wherein the at least one neural network processor further comprises a plurality of neural network processors each programmed to generate one of the predicted speed profiles.

5. The vehicle of claim 1 wherein the group of driving zone types includes a free flow traffic area, a stop sign traffic area, a traffic light traffic area, a turn traffic area, a freeway entrance ramp area, a freeway exit ramp area, or an inter-freeway ramp area.

6. A vehicle comprising:
  a powertrain; and
  a controller having a neural network assigned to a driving zone type and programmed to operate the powertrain along a route segment defined by the driving zone type according to a predicted speed profile associated with the driving zone type, and update the predicted speed profile for use in subsequent trips along the route segment based on a measured deviation from the predicted speed profile.

7. The vehicle of claim 6 wherein another neural network is programmed to classify each of a series of segments of a route into one of a plurality of driving zone types.

8. The vehicle of claim 7 wherein each of the series of segments of the route is classified based on a speed profile shape that is characteristic of a single driving zone type.

9. The vehicle of claim 7 wherein the plurality of driving zone types includes a free flow traffic area, a stop sign traffic area, a traffic light traffic area, a turn traffic area, a freeway entrance ramp area, a freeway exit ramp area, or an inter-freeway ramp area.

10. The vehicle of claim 6 wherein the neural network is programmed to generate the predicted speed profile based on data corresponding to historical driving patterns.

11. The vehicle of claim 6 wherein the powertrain includes an electric machine and an engine, each capable of selectively providing output torque to propel the vehicle.

* * * * *